March 10, 1942.  G. M. RUHKALA  2,275,994

TIRE CHAIN

Filed Sept. 9, 1940

INVENTOR
G. M. Ruhkala
BY

Patented Mar. 10, 1942

2,275,994

UNITED STATES PATENT OFFICE 2,275,994

TIRE CHAIN

Gideon Michael Ruhkala, Rocklin, Calif.

Application September 9, 1940, Serial No. 355,889

5 Claims. (Cl. 152—219)

This invention relates generally to an improvement in tire chains, and in particular the invention is directed to, and it is my principal object to provide tire chains having a unique connection assembly arranged to facilitate and simplify installation of the tire chains on vehicle tires.

Another object of the invention is to provide tire chains as above wherein the connection assembly is arranged so that the laterally inward circumferential run of the chains may be taken up and secured with relative ease thereby avoiding the difficulty usually attendant in taking up and connecting such portion of ordinary tire chains.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
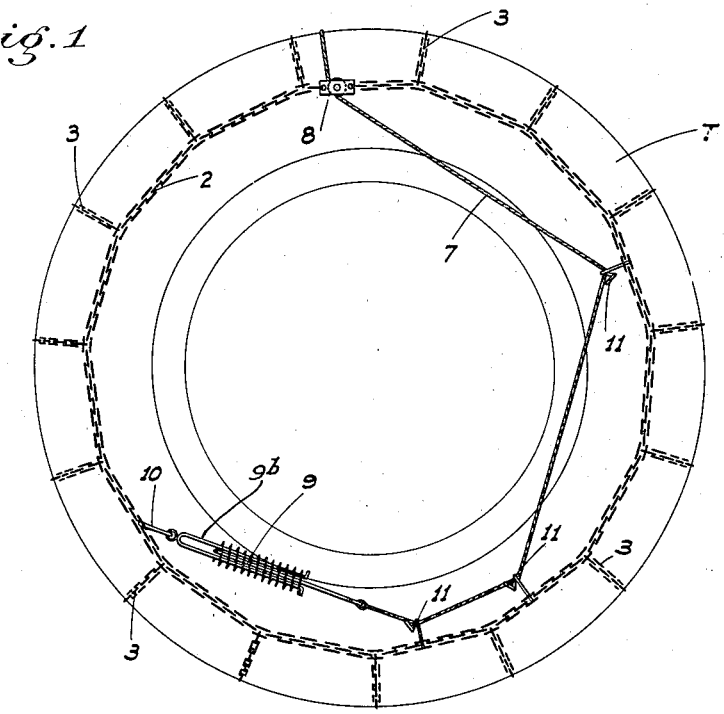
Figure 1 is an elevation of the laterally outer portion of the tire chain as applied to a tire.
Figure 2:
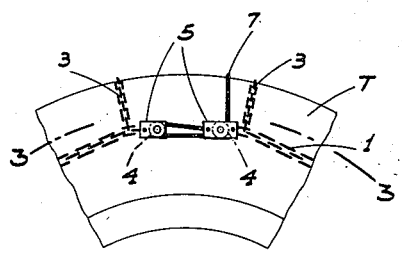
Figure 2 is a fragmentary elevation illustrating the take up device which connects adjacent ends of the laterally inward circumferential run of the chain.
Figure 3:
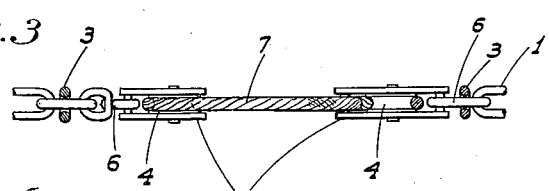
Figure 3 is an enlarged fragmentary section taken on line 3—3 of Fig. 2.
Figure 4:
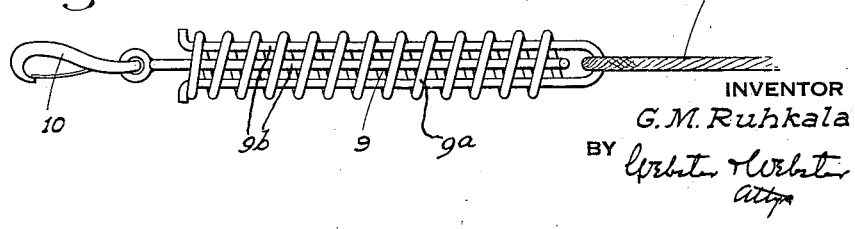
Figure 4 is an enlarged elevation of the tension spring and snap hook assembly.

Referring now more particularly to the characters of reference on the drawing, my improved tire chain comprises as usual laterally inner and outer circumferential runs indicated at 1 and 2 respectively; such runs being connected by means of cross chains 3.

The adjacent ends of run 1 are connected to the spaced sheaves 4 of a single sheave block and tackle 5 by means of connection links 6; the cable 7 of such block and tackle being relatively small and flexible.

From block and tackle 5 the cable passes over a sheave 8 which extends between and non-releasably secures adjacent ends of run 2 in connected relation; the cable 7 being of substantial length beyond sheave 8. At its outer end cable 7 is connected to one end of a tension spring unit 9, and a flat spring snap hook 10 is swivelly secured to the other end of such spring unit. The spring unit 9 is of common form and includes a compression spring 9a engaged at its ends with the out-turned ends of oppositely disposed U shaped wire members 9b which extend lengthwise through the spring in telescopic or sliding relation. As a result, expansion of the spring acts to draw the outer ends of members 9b toward each other.

In use, the above described tire chain is applied to a tire in the following manner.

The block and tackle 5 is first extended some distance, and thereafter the tire chain is encircled about the tire T, an operation which can be accomplished by either jacking up the wheel or by running the wheel ahead slowly as the chain is placed over the tire. As initially encircled about the tire the laterally inner run of the chain is quite loose due to the extension of the block and tackle 5.

After the chain is in place on the tire, cable 7 is drawn up until the block and tackle 5 has shortened to an extent sufficient to tighten run 1; the cable then passing taut over the tire and through sheave 8. From sheave 8 the taut cable is engaged with a plurality of circumferentially spaced, turn-and-a-half open loops 11 fixed on run 2 of the chain. Beyond these loops or hooks 11, spring unit 9 is placed under tension and snap 10 engaged with one of the links of run 2; the tension of spring 9 maintaining cable 7 taut and the block and tackle properly drawn up. Loops 11 prevent cable 7 from passing over and scarring the wheel hub cap.

As is apparent the entire tightening and securing of the tire chain on a tire can be accomplished from a point on the outside of the tire and wheel without necessity of manipulating connecting elements laterally inward of the tire as is necessary with conventional tire chains.

It will be noted that one of the cross chains 3 is disposed near the portion of cable 7 which passes over the tire, so as to shield the latter from excessive wear.

While in the present embodiment cable 7 passes over the tire, the device may be so designed that the cable may pass through the wheel and under the tire.

It will be noted that one of the links 6 is of the swivel type, so that said link may be attached to any chain link without the adjacent sheave 4 being placed out of alinement with the other sheave.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A connection assembly for a tire chain having laterally inward and outward circumferential runs adapted to be disposed on opposite sides of the tire, said assembly comprising a block and tackle assembly connected between adjacent ends of the laterally inward run of the chain, said assembly including a flexible cable, a sheave interposed in the laterally outward run of the chain adjacent said assembly, the cable passing from the tackle laterally of the tire and about said sheave, and means on the free end of said cable arranged for releasable connection with said laterally outward run at a point spaced from said sheave.

2. A connection assembly for a tire chain having laterally inward and outward circumferential runs, said assembly comprising a block and tackle assembly connected between adjacent ends of the laterally inward run of the chain, said assembly including a flexible cable, a sheave interposed in the laterally outward run of the chain adjacent said assembly, the cable passing about said sheave, a spring tension unit connected at one end on the free end of said cable, and a chain-link engaging hook connected with the other end of the spring unit.

3. A connection assembly for a tire chain having laterally inward and outward circumferential runs, said assembly comprising a block and tackle assembly connected between adjacent ends of the laterally inward run of the chain, said assembly including a flexible cable, a sheave interposed in the laterally outward run of the chain adjacent said assembly, the cable passing about said sheave, a spring tension unit connected at one end on the free end of said cable, and a snap hook connected with the other end of the spring; there being a plurality of open loops fixed on said laterally outward run and through which loops the cable passes between said sheave and spring.

4. A tire chain including an outer chain run of fixed length, an inner run comprising a chain having its ends separated and an extensible and contractible block and tackle unit permanently connecting said ends and forming a portion of the circumferential extent of said run, one block of said unit having its axis substantially parallel to the tire axis and said unit including a cable adapted to extend transversely across the tire and to be pulled in a direction away from the tire from a point laterally out therefrom and a guide element for said cable mounted on the outer chain run.

5. A tire chain including an outer chain run of fixed length, an inner run comprising a chain having its ends separated, a flexible pull member extending laterally across the tire, and connecting means between the spaced ends of said inner run and including said member in part whereby a pull on the member in a direction transversely of the tire will tend to move said separated ends of the chain toward each other in a substantially straight path.

GIDEON MICHAEL RUHKALA.